United States Patent [19]

Masuko et al.

[11] Patent Number: 5,789,499
[45] Date of Patent: Aug. 4, 1998

[54] POLYMERIZATION PROCESS OF VINYL CHLORIDE IN THE PRESENCE OF OXYGEN

[75] Inventors: Seiichi Masuko; Yoshihiro Umeda; Katsuhito Kohketsu; Ichisaburo Nakamura; Akihiko Takahashi, all of Takaishi, Japan

[73] Assignee: Mitsui Chemicals, Inc., Tokyo, Japan

[21] Appl. No.: 777,059

[22] Filed: Dec. 30, 1996

Related U.S. Application Data

[63] Continuation of Ser. No. 357,162, Dec. 13, 1994, abandoned.

[30] Foreign Application Priority Data

Dec. 27, 1993  [JP]  Japan .................. 5-332397

[51] Int. Cl.$^6$ ............................ C08F 2/20
[52] U.S. Cl. ........................................ 526/62
[58] Field of Search ................................. 526/62

[56] References Cited

U.S. PATENT DOCUMENTS

| | | | |
|---|---|---|---|
| 4,080,173 | 3/1978 | Cohen | 526/62 |
| 4,110,527 | 8/1978 | Chesler et al. | |
| 4,320,215 | 3/1982 | Yonezawa et al. | 526/62 |
| 5,115,051 | 5/1992 | Shimizu | 526/62 |
| 5,399,613 | 3/1995 | Shimizu | 524/540 |

FOREIGN PATENT DOCUMENTS

| | | |
|---|---|---|
| 462284 | 12/1991 | European Pat. Off. |
| 3822467 | 1/1990 | Germany |
| 60-59246 | 12/1985 | Japan |
| 62-3841 | 1/1987 | Japan |

OTHER PUBLICATIONS

EP 358 364, Mar. 1990.
WPI Accession No. 89–052283/07 & RO 95242, Osanu et al, Aug. 30, 1988, Week 8907.
WPI Accession No. 89–171167/23 & RO 96095, Patrascu et al. Nov. 10, 1988, Week 8923.

*Primary Examiner*—Christopher Henderson
*Attorney, Agent, or Firm*—Burns, Doane, Swecker & Mathis, L.L.P.

[57] ABSTRACT

A process is provided for the polymerization of vinyl chloride in a closed mode. According to the process, oxygen is caused to exist in a polymerizer, which is coated with an anti-fouling agent, during an operation in which the polymerization is repeated. The process according to this invention has made it possible to fully exhibit effects of the anti-fouling. This has in turn made it possible to achieve polymerization of vinyl chloride in the closed mode, leading to an improvement in productivity.

9 Claims, No Drawings

POLYMERIZATION PROCESS OF VINYL CHLORIDE IN THE PRESENCE OF OXYGEN

This application is a continuation of application Ser. No. 08/357,162, filed Dec. 13, 1994 and now abandoned.

BACKGROUND OF THE INVENTION a) Field of the Invention

This invention relates to a polymerization process of vinyl chloride, and more specifically to a process for polymerizing vinyl chloride while using a polymerizer in a closed mode.

b) Description of the Related Art

Polyvinyl chloride is an extremely useful resin as a commodity resin having excellent properties. Polyvinyl chloride is generally produced by aqueous suspension polymerization. In conventional aqueous suspension polymerization processes for vinyl chloride, the resulting polymer sticks rather firmly on a wall surface of a polymerizer. Thus it has heretofore been the practice to take the contents out of the polymerizer subsequent to the polymerization, open the polymerizer and then clean up the interior with substantial labor prior to the initiation of the next polymerization. With a view toward preventing sticking of a polymer on a wall of a polymerizer so that environmental pollution can be avoided and productivity can be improved, some methods have been developed in recent years for the application of an anti-fouling agent on a wall of a polymerizer. These methods have made it possible to substantially reduce the amount of polymer stuck on a polymerizer wall and further, to prevent the polymer from firmly sticking on the polymerizer wall. As a result, it has now become possible to remove adhered polyvinyl chloride from a wall of a polymerizer by opening the polymerizer and then simply washing the polymerizer with high-pressure water subsequent to the polymerization of vinyl chloride, resulting in significant simplification of the washing operation.

Further, effective anti-fouling agents have also been developed. They have now made it possible to perform polymerization in a so-called closed mode, that is, to conduct the next polymerization operation after washing the inside of a polymerizer with water without practically opening the polymerizer subsequent to the polymerization of vinyl chloride.

However the present inventors have found the existence of the problem that the effects of an anti-fouling agent for the prevention of adhesion of a polymer on a wall of a polymerizer are reduced when employed in polymerization in a closed mode although the anti-fouling agent has been effective conventionally, that is, when the polymerizer is opened.

SUMMARY OF THE INVENTION

An object of the present invention is therefore to overcome the above-described problem and hence to provide a process for the polymerization of vinyl chloride, which can fully exhibit the effects of an anti-fouling agent even when the polymerization is conducted in the so-called closed mode.

To attain the above object, the present inventors have conducted an extensive investigation. As a result, it has surprisingly been found that oxygen is important upon repeatedly performing polymerization in a closed mode, leading to the present invention.

In one aspect of the present invention, there is thus provided a process for the polymerization of vinyl chloride in a closed mode, which comprises causing oxygen to exist in a polymerizer, which is coated with an anti-fouling agent, during an operation in which the polymerization is repeated.

Preferably, the oxygen may be caused to exist in the polymerizer so that anti-fouling effects are retained.

DESCRIPTION OF THE PREFERRED EMBODIMENTS

An aqueous suspension polymerization of vinyl chloride can be conducted using a polymerizer in a closed mode. The polymerization is initiated by charging raw materials such as water as a suspending medium, a dispersing agent, a polymerization initiator and vinyl chloride monomer and then heating the raw materials. According to the present invention, oxygen is caused to exist until the polymerization is initiated. It is preferred to control the concentration of the oxygen at 10–1000 ppm by weight based on the vinyl chloride monomer charged at the time of the polymerization.

The oxygen may preferably be caused to exist at 300–10000 ppm by weight in a gas phase of the polymerizer before, during or after application of the anti-fouling agent.

In this case, it is preferred to polymerize the vinyl chloride monomer after controlling the concentration of the oxygen at 10–1000 ppm by weight based on the vinyl chloride monomer charged at the time of the initiation of the polymerization.

In the above process, the anti-fouling agent can preferably be a condensate of a compound having a phenolic hydroxyl group, a self-condensate of a compound having a phenolic hydroxyl group, or a modified product thereof.

The term "a closed mode" as used herein means that after completion of a polymerization reaction and discharge of a slurry, the next polymerization is conducted without opening the polymerizer to the atmosphere while vinyl chloride monomer still remains in a gas phase inside the polymerizer. The next polymerization can be conducted by simply washing any remaining polymer out of the polymerizer without opening the interior of the polymerizer. This can avoid release of vinyl chloride monomer into the atmosphere and/or can simplify the recovery of vinyl chloride monomer from the polymerizer. The expression "without opening . . . to the atmosphere" as used herein means, for example, that an operator does not perform such an operation as opening a manhole of the polymerizer or purging the interior of the system with an inert gas such as air or nitrogen.

The present inventors conducted an investigation for the development of an anti-fouling agent which is useful in reducing the amount of a polymer adhering to a wall upon polymerization of vinyl chloride. That investigation resulted in the development of fully effective anti-fouling agents and an application method thereof and as disclosed in EPC 0462284A1, revealed an excellent method. The present inventors then proceeded with a further investigation on polymerization processes of vinyl chloride in order to achieve polymerization of vinyl chloride in a closed mode by applying these excellent methods. Polymerization of vinyl chloride in a closed mode by the use of the excellent anti-fouling agent and application method thereof described above indicated that the inherent effects of the anti-fouling agent are lowered when the raw materials are repeatedly charged and polymerized without opening the polymerizer after the polymerization of vinyl chloride in each batch. As a result, it came to the knowledge that maintenance of high polymer quality requires opening the polymerizer and then removing adhered polymer from its wall, resulting in a reduction in the number of batches polymerizable in the closed mode.

The present inventors have proceeded with a study to determine the cause for the above reduction in the effects of the anti-fouling agent. The study included charging oxygen in a small amount upon polymerization in a closed mode. It has now been found surprisingly that the existence of a small amount of oxygen upon polymerization in a closed mode is important for allowing an anti-fouling agent to exhibit its inherent performance, leading to the present invention.

The polymerization of vinyl chloride by the process of this invention can be conducted in a similar manner to a known polymerization process except that a polymerizer is used in a closed mode and oxygen is caused to exist in the polymerizer.

Namely, vinyl chloride monomer and if necessary, a monomer copolymerizable with the vinyl chloride monomer are heated and polymerized in the presence of water, a dispersing agent and a polymerization initiator. After the polymerization, an aqueous slurry of the resultant polymer is discharged, any polymer remaining in the polymerizer is cleaned off with water, and polymerization is then conducted. This operation is repeated.

For the process of the present invention, any known polymerizer and equipments effective for the improvement of productivity, which is an object of the present invention, can be used. A polymerizer having a capacity of 20–350 m$^3$, preferably 40–250 m$^3$ can be used. It is recommended to use a reflux condenser for the removal of heat of polymerization.

Although the process according to the present invention can be applied to both bulk polymerization and suspension polymerization, it is effective especially for suspension polymerization.

Suspension polymerization uses water as a medium. The polymerization can be conducted by using water and vinyl chloride monomer at a known ratio, for example, at a water/vinyl chloride ratio of from 0.8 to 1.5, preferably from 0.85 to 1.2, more preferably from 0.9 to 1.0.

The process of the present invention can also be applied for the polymerization of vinyl chloride or for the copolymerization or graft polymerization of vinyl chloride as a principal component.

No particular limitation is imposed on monomers copolymerizable with vinyl chloride insofar as they are commonly employed for copolymerization with vinyl chloride. Illustrative examples of such copolymerizable monomers include vinyl esters such as vinyl acetate, vinyl caproate and vinyl stearate; olefins such as ethylene, propylene, butene and isobutylene; vinyl ethers such as isobutyl vinyl ether, octyl vinyl ether, dodecyl vinyl ether and phenyl vinyl ether; halogenated olefins such as vinylidene chloride, vinyl fluoride, propylene chloride and vinyl bromide; acrylates and methacrylates such as ethyl acrylate, n-butyl acrylate, n-butyl methacrylate, 2-ethylhexyl acrylate, 2-ethylhexyl methacrylate and stearyl acrylate; acrylic acid; methacrylic acid; maleic acid; maleic anhydride; fumaric acid; itaconic anhydride; acrylonitrile; and methacrylonitrile. They can be used either singly or in combination. It is however preferred to use one or more of these copolymerizable monomers in a total amount not exceeding 15 wt. % based on vinyl chloride.

Graft polymerization can be conducted by a known graft polymerization process in which vinyl chloride is graft-polymerized on a polymer. Examples of the polymer employed upon conducting the graft polymerization include ethylene-vinyl acetate copolymer (EVA), ethylene-ethyl acrylate copolymer, chlorinated polyethylene, polyurethane, butadiene-styrene-methyl methacrylate (MBS), butadiene-acrylonitrile-(α-methyl)styrene copolymer (ABS), polybutyl acrylate, butyl rubber, polystyrene, and styrene-butadiene copolymer.

In the present invention, a polymerization initiator employed generally in the polymerization of vinyl chloride, especially an oil-soluble radical initiator is used as a polymerization initiator. Illustrative usable polymerization initiators include percarbonates such as diisopropyl peroxydicarbonate, dioctyl peroxydicarbonate, dilauryl peroxydicarbonate, dimyristyl peroxydicarbonate, dicetyl peroxydicarbonate, di-tert-butyl peroxydicarbonate, di(ethoxyethyl) peroxydicarbonate, di(methoxyisopropyl) peroxydicarbonate, di(n-methoxybutyl) peroxydicarbonate, di(3-methoxy-3-methylbutyl) peroxydicarbonate, di(butoxyethyl) peroxydicarbonate, di(2-isopropoxyethyl) peroxydicarbonate, di(2-isopropoxyethyl) peroxydicarbonate, dibenzyl peroxydicarbonate, dicyclohexyl peroxydicarbonate, and di-tert-butylcyclohexyl peroxydicarbonate; peresters such as tert-butyl peroxyneodecanoate, amyl peroxyneodecanoate, tert-octyl peroxyneodecanoate, α-cumyl peroxyneodecanoate, tert-butyl peroxypivalate, amyl peroxypivalate, tert-octyl peroxypivalate, α-cumyl peroxytoluenepivalate, perhexyl oxalate, di-tert-butyl peroxyoxalate, acetylcyclohexylsulfonyl peroxide, and 1,1,3,3-tetramethylbutyl peroxyphenoxyacetate; and azo compounds such as 2,2'-azobisisobutyronitrile, 2,2'-azobis-2,4-dimethylvaleronitrile, and 2,2'-azobis-4-methoxy-2,4-dimethylvaleronitrile. As is done commonly, these polymerization initiators can be used in combination. To provide a constant polymerization reaction velocity, it is recommended to use two or more of these polymerization initiators in combination and to charge them into a polymerizer through a pump. These polymerization initiators can be used either as are or in the form of an aqueous emulsion or suspension or in a form dissolved in a solvent such as toluene.

In the process of the present invention, a known dispersing agent commonly employed in the polymerization of vinyl chloride can also be used. Usable exemplary dispersing agents include synthetic high molecular compounds such as fully saponified or partially saponified polyvinyl alcohol, methyl cellulose, ethyl cellulose, hydroxyethyl cellulose, hydroxypropyl cellulose, hydroxypropylmethyl cellulose, carboxymethyl cellulose, polyvinylpyrrolidone, and maleic anhydridevinyl acetate copolymer; and natural high-molecular substances such as starch and gelatin. Known dispersing agents which are formed in combination of two or more of these dispersing agents can be used.

Described specifically, provision of PVC of high bulk specific gravity by the present invention can be achieved, for example, by using polyvinyl alcohol of a saponification degree of 90 mole % or more in an amount of from 30 to 70 wt. % of the total amount of dispersing agents. As another example, provision of PVC of smaller fish eyes can be achieved by using polyvinyl alcohol of having a saponification degree of 40–50 mole % and a polymerization degree of 200–300 in an amount of from 30 to 60 wt. % of the total amount of dispersing agents.

The dispersing agent is generally used in an amount of 0.02–0.2 part by weight, preferably 0.04–0.18 part by weight, more preferably 0.06–0.15 part by weight per 100 parts by weight of vinyl chloride monomer.

In the process of the present invention, it is necessary to apply an anti-fouling agent (hereinafter abbreviated as "a coating agent") on a wall of a polymerizer or the like, with which vinyl chloride monomer may be brought into contact. A known anti-fouling agent can be applied by a known method. The application of a coating agent is preferably conducted prior to polymerization. It is however not absolutely necessary to apply the coating agent prior to charging every polymerization batch.

Any coating agent known as an anti-fouling agent for vinyl chloride can be used. For example, a condensate of a compound having a phenolic hydroxyl group can be used. In particular, a self-condensate of a compound having a phenolic hydroxyl group, a condensate of a compound having a phenolic hydroxyl group, or a modified product thereof can be mentioned. Specifically, illustrative examples of the self-condensate of the compound having a phenolic hydroxyl group include self-condensates of monohydric to polyhydric phenol compounds disclosed in U.S. Pat. No. 4,080,173. The condensate of a compound having a phenolic hydroxyl group can be a condensate of a monohydric or polyhydric phenol and an aldehyde, a condensate formed by using two or more monohydric and/or polyhydric phenols and two or more aldehydes upon preparation of the condensate, a condensate obtained by condensing a compound other than phenols, or a modified product thereof. Specific examples of these coating agents include the coating agents disclosed in EPC 0462284A1, the pyrogallol-aldehyde condensates disclosed in Japanese Patent Publication No. 59246/1985, and the self-condensates of phenols disclosed in Japanese patent Publication No. 3841/1987. Particularly preferred examples include the coating agents recited in claims 4 to 25 and 27 of EPC 0462284A1, the coating agents disclosed on page 4, line 48 to page 9, line 35, especially those described in Examples 3, 11, 13 and 17.

Coating agents preferred for use in the process of the present invention are resol-type initial condensates obtained by reacting phenols and aldehydes in the presence of a basic catalyst. More preferred are modified products which have been obtained by modifying such initial condensates with various modifiers. Illustrative phenols include monohydric phenols such as phenol, cresol and ethylphenol; dihydric phenols such as resorcin and hydroquinone; bisphenols such as bisphenol A; and their substituted derivatives. They can be used either singly or in combination. Exemplary aldehydes include CHO-containing organic compounds such as formaldehyde, acetaldehyde, furfural, propionaldehyde, butylaldehyde, acrolein, crotonaldehyde, benzaldehyde, phenylacetaldehyde, 3-phenylpropionaldehyde and 2-phenylpropionaldehyde. They can be used either singly or in combination. Particularly preferred are formaldehyde and acetaldehyde.

Examples of modifiers include alkylphenols and polyhydric phenols.

Illustrative of the basic catalyst include sodium hydroxide, potassium hydroxide, ammonia and amines, with sodium hydroxide being particularly preferred.

Regarding the proportions of the respective reactants upon conducting the reaction, the aldehyde can be reacted in an amount of 1.1–3.0 moles, preferably 1.2–2.0 moles per mole of the phenol. The basic catalyst can be formed preferably in an amount of 0.02–0.5 mole per mole of the phenol. The reaction is conducted generally at 70°–150° C. for 1–6 hours. This reaction product will hereinafter be abbreviated as the "resol-type condensate".

Coating agents preferred for use in the present invention are those obtained by further condensing at least one modifier selected from hindered phenols, nitrogen-containing compounds and polyhydric phenols with the above-described phenol-aldehyde condensates in the presence of an acidic catalyst, especially a strongly-acidic catalyst.

The hindered phenols usable in the above condensation means monohydric and dihydric hindered phenols, for example, o-sec-butylphenol (OSBP) and 2-t-butylhydroquinone. Although no particular limitation is imposed on polyhydric phenols, catechol, resorcin, hydroquinone, pyrrogallol and phloroglucin can be mentioned by way of example. Examples of nitrogen-containing compounds include nitrophenols, nitrobenzoic acids, nitrobenzenesulfonic acids, aminophenols and aminobenzenesulfonic acids. Acidic catalysts include sulfuric acid, hydrochloric acid, perchloric acid, p-toluenesulfonic acid, methanesulfonic acid and trifluoromethanesulfonic acid, with hydrochloric acid and p-toluenesulfonic acid being particularly preferred.

Each modified product can be obtained by reacting the polyhydric phenol with the resol-type condensate at 70°–150° C. for 1–6 hours in the presence of a basic catalyst. Here, a hindered phenol, a nitrogen-containing compound and/or a polyhydric phenol can be used in an amount of 0.01–2.0 moles, preferably 0.02–0.8 mole per mole of the phenol used for the preparation of the resol-type condensate. The acidic catalyst, on the other hand, can be used preferably in an amount of 0.02–0.5 mole per mole of the phenol used for the preparation of the resol-type condensate, with a range of 0.05–0.3 being more preferred.

In the process of the present invention, a reaction product between a dihydroxybiphenyl and an aldehyde, said reaction product being represented by the following formula, can also be used as a preferred anti-fouling agent:

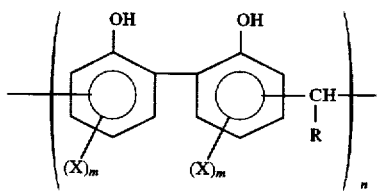

wherein R represents a $C_{1-8}$ alkyl, cycloalkyl, aryl or aralkyl group, X represents a carboxyl, alkyl or cycloalkyl group, m stands for an integer of 0–2, and n is an integer of 2–500.

Examples of the above dihydroxybiphenyl include 2,2'-dihydroxybiphenyl, 2,2'-dihydroxy-5,5'-dimethylbiphenyl, 2,2'-dihydroxy-4,4',5,5'-tetramethylbiphenyl, 2,2'-dihydroxy-5,5'-dichlorobiphenyl, 2,2'-dihydroxy-5,5'-dicyclohexylbiphenyl, 2,2'-dihydroxy-5,5'-di-tertbutylbiphenyl, with 2,2'-dihydroxybiphenyl being particularly preferred.

The above reaction between the dihydroxybiphenyl and the aldehyde is conducted in the presence of the above-described acidic catalyst. The preferred molar ratio of the aldehyde to the dihydroxybiphenyl is 1 or smaller, preferably 0.5–1.0, more preferably 0.6–0.9. The reaction temperature may preferably be 50°–200° C., with 100°–150° C. being more preferred. It is generally preferred to conduct the reaction in the presence of a solvent, for example, an aromatic hydrocarbon such as toluene, a halogenated hydrocarbon such as dichloroethane or monochlorobenzene, a ketone or an ether. For use in the present invention, the dihydroxybiphenylaldehyde reaction product may preferably have a molecular weight of 500–100,000, more preferably 1,000–50,000 for better adhesion to a polymerizer wall.

The above-described anti-fouling agent is generally dissolved in a 0.05–5 wt. % aqueous solution of an alkali metal or alkaline earth metal hydroxide to give a concentration of 0.1–10 wt. %, preferably 0.2–6.0 wt. %. Illustrative of the alkali metal or alkaline earth metal hydroxide include sodium hydroxide, potassium hydroxide and calcium hydroxide.

The coating agent can be used as an aqueous solution as described above. It is however possible to use the coating component by adding water to the aqueous solution, as needed, to dilute the same and then adding an acid thereto to adjust its pH so that the coating component is caused to deposit for isolation.

Illustrative application methods for the coating agent include mere coating or spraying of the coating composition. Although no particular limitation is imposed on its application method, the method recited in any one of claims 1–3 of EPC 0462284A1 is mentioned as a preferred coating method. It is however to be noted that the coating agent can be applied by any method commonly employed in the present field of art without being limited to the application method of the above European patent application.

For example, the coating agent can be sprayed by a sprayer onto various parts inside a polymerizer, to which the monomer may be brought into contact, as disclosed in Examples 1–3 of Japanese Patent Publication No. 843/1986. As a further alternative, as is disclosed in Example 8 of EPC 0462284A1, the coating agent can be applied in the form of a solution whose pH has been adjusted so that the coating agent is in a dissolved form at a temperature at the time of application onto a polymerizer surface but is allowed to deposit when heated on the polymerizer surface. When applied as described above, the solution of the coating agent is applied in the form of a thin film and moreover, uniformly and firmly on the wall of the polymerizer, so that excellent anti-fouling effects can be obtained.

According to the process of the present invention, it is necessary to apply a coating agent onto a wall of a polymerizer prior to polymerization. A known anti-fouling agent can be applied in a manner known per se in the art.

The most preferred application method for the process of the present invention is described in claims 1–3 of EPC 0462284A1 and also at page 4, lines 4–22 of the publication.

Described more specifically, this application method comprises applying a solution of a coating agent, the pH of said solution having been adjusted so that the coating agent is in a dissolved form at a temperature before and at the time of application onto the wall of the polymerizer but is allowed to deposit when heated on the heated wall of the polymerizer. This application method makes it possible to uniformly and firmly apply the solution of the coating agent as a thin film on the wall and accordingly, to obtain excellent anti-fouling effects.

The coating component in the above solution of the coating agent deposits at lower pHs and also at higher temperatures. The pH is therefore adjusted to a level higher by 0.2–4.0, preferably 0.3–3.0 than the pH at which the coating agent deposits at room temperature. If the pH so adjusted is higher by only 0.2 or less than the pH at which the coating agent deposit at room temperature, the coating agent may deposit on standing prior to its application. If the pH is higher by more than 4.0, the coating agent may not deposit even when the wall is heated. Such low and high pHs are therefore not preferred.

As has been described above, the coating agent is generally applied in a form dissolved in an aqueous solution of an alkali metal or alkaline earth metal hydroxide. Accordingly, the pH is usually adjusted by adding an acid. Examples of pH-adjusting acids include inorganic acids such as hydrochloric acid, sulfuric acid, phosphoric acid and nitric acid as well as organic acids such as ascorbic acid, acetic acid, citric acid and mercaptopropionic acid.

Upon application of the solution of the coating agent onto a wall and the like of a polymerizer in the present invention, it is desired to heat the wall to a temperature of at least 40° C. but not higher than 100° C. Temperatures lower than 40° C. cannot cause the coating agent to deposit even if the pH is adjusted as specified above, thereby failing to bring about its anti-fouling effects. Temperatures higher than 100° C., on the other hand, take too much heating time so that such high temperatures are impractical. The temperature of the wall is therefore preferably 45°–95° C., more preferably 50°–90° C. In view of the quality of the product, it is preferred to wash the interior of the polymerizer with water subsequent to the application and deposition of the coating agent.

According to the process of the present invention, it is necessary to allow the coating agent to exist on a wall and the like of a polymerizer. No particular limitation is imposed on the method for allowing the coating agent to exist there. It can be conducted by a usual method, for example, by brushing or spraying a solution of the coating agent onto the wall and the like of the polymerizer or by rinsing the polymerizer with the solution of the coating agent.

The coat amount on the wall and the like can be 0.005–10 $g/m^2$, preferably 0.01–5 $g/m^2$ in terms of the weight of the coating agent.

According to the process of the present invention, vinyl chloride is polymerized in a closed mode, that is, vinyl chloride is polymerized in a polymerizer coated with an anti-fouling agent and without opening the polymerizer, polymerization of the next batch is conducted, followed by repetition of polymerization of further batches.

This oxygen can be furnished by adding oxygen into the reaction system. Needless to say, air can be used preferably.

The oxygen can be added after the completion of polymerization and the subsequent discharge of the resultant polymer slurry but before the completion of charging of vinyl chloride monomer into the polymerizer. It is preferred to add the oxygen in a period from shortly before application of the anti-fouling agent until the completion of charging of vinyl chloride monomer in the polymerizer.

The amount of oxygen to be allowed to exist upon the initiation of polymerization can be 10–1000 ppm by weight, preferably 15–300 ppm by weight, more preferably 15–100 ppm by weight based on the vinyl chloride monomer. This range is preferred as the anti-fouling effects of the present invention can be achieved and the polymer can be obtained with good quality in particle size distribution, thermal stability and the like.

It is also a preferred embodiment to apply the anti-fouling agent in the presence of 300–10,000 ppm by weight of oxygen in a gas phase of the polymerizer. In this case, the amount of oxygen at the time of initiation of polymerization is adjusted to 10–1000 ppm by weight, preferably 15–300 ppm by weight, more preferably 15–100 ppm by weight based on the vinyl chloride monomer.

It is necessary to adjust the amount of oxygen so that the oxygen in the system falls within the above range. It is controlled in view of the vinyl chloride monomer, the amount of oxygen contained in water, etc.

The present invention will hereinafter be described in further detail by examples. It should however be borne in mind that the present invention is not limited to or by the below-described examples.

In the following description, all designations of "part" or "parts" mean part or parts by weight, and all designations of "phm" indicate the weights of materials other than vinyl chloride monomer, which were charged per 100 parts by weight of vinyl chloride monomer.

Physical properties were measured by the following methods:

(1) Amount of Oxygen in a Polymerization System

The amount of oxygen in the polymerization system was determined by measuring the volumes and concentrations of oxygen in a liquid phase and a gas phase in the system.

(2) Bulk Specific Gravity

The method specified under JIS K6721 was followed.

(3) Fish Eyes

The following composition was thoroughly mixed. A two-roll mill was heated to 145° C., in which the composition was kneaded at roll speeds of 15 and 21 rpm for 5 minutes. The composition so kneaded was then taken out of the two-roll mill in the form of a sheet through a 0.3 mm spacing between the rolls. Thereafter, the number of fish eyes present in an area of 15×10 cm was counted.

| Composition | |
| --- | --- |
| Resin | 100 g |
| DOP | 60 g |
| Cd-Ba stabilizer ("ADVASTABBC = 1000J", trade name, product of TOA RIKA K. K.) | 5 g |
| Carbon | 0.1 g |

(4) Thermal Stability Test

The method specified under JIS K6723 was followed.

Two grams of a rolled sheet, which had been obtained from the below-described composition under the rolling conditions also shown below, were placed in a test tube JIS R3503 (glass equipment for chemical analysis; outer diameter: 15 mm; length: 40 mm). A Congo red test paper was soaked with specified glycerin [JIS K8295: Glycerin (reagent)]. After the test paper was pinched between sheets of filter paper and extra glycerin was wiped off, the test paper was inserted in the test tube and with purified cotton, held upright as centrally as possible so that the lower end of the test paper is located 100 mm the way up from the bottom of the test tube. The test tube so prepared was then immersed upright in an oil bath controlled at 180°±3° C., with the bottom of the test tube being apart by 70 mm or more from the level of the oil. The time required from the immersion of the test tube in the oil bath until the free end of the test paper turned to a vivid blue color was measured.

| Composition | |
| --- | --- |
| PVC | 100 parts |
| Pbst | 2.2 parts |
| Bast | 0.6 parts |
| TS (dibasic lead sulfate) | 0.5 parts |
| Rolling conditions | |
| Temperature | 155° C. |
| Thickness | 0.7 mm |
| Kneading time | 7 min |

PREPARATION EXAMPLE 1

(Phenol-Type Anti-Fouling Agent A and Solution Thereof)

In a 1.5-m³ reaction vessel made of stainless steel and equipped with a reflux condenser, 154.0 kg (1.64 kmol) of phenol, 199.3 kg (2.46 kmol) of a 37% aqueous solution of formaldehyde, and 2.62 kg (0.066 kmol) of sodium hydroxide were charged. The contents were then heated to 85° C. over 30 minutes under stirring. While maintaining the contents at the same temperature, they were reacted for 2 hours and 40 minutes. The resol so obtained was found to have a viscosity of 10.4 cps when measured at 85° C. by a Brookfield viscometer. The resol was also analyzed for residual formaldehyde by the sodium sulfite method. Residual formaldehyde was not detected. The weight average molecular weight (Mw) of the resol as measured by gel permeation chromatography was 410.

The above reaction product was then cooled to 50° C., to which 36.0 kg (0.328 kmol) of resorcin were gradually added as a modifier. The resulting mixture was heated to 85° C. over 30 minutes under stirring. While maintaining the mixture at the same temperature, the condensation reaction was continued. When the viscosity of the reaction product arose to 1,000 cps when measured by the Brookfield viscometer, the temperature of the reaction mixture was lowered, followed by the addition of an aqueous solution of sodium hydroxide to terminate the reaction. The pH and Mw of the condensate so obtained were 11.1 and 1,550, respectively.

The condensate obtained above was formulated as an anti-fouling agent A into a 2.0% aqueous solution in a 0.4% aqueous NaOH solution. The pH of the alkaline aqueous solution so obtained was adjusted to pH 7.0 with citric acid, so that a solution of the anti-fouling agent A was obtained.

PREPARATION EXAMPLE 2

(Phenol-Type Anti-Fouling Agent B and Solution Thereof)

In a 1.5-m³ reaction vessel made of stainless steel and equipped with a reflux condenser, 154.0 kg (1.64 kmol) of phenol, 199.3 kg (2.46 kmol) of a 37% aqueous solution of formaldehyde, and 2.62 kg (0.066 kmol) of sodium hydroxide were charged. The contents were then heated to 85° C. over 30 minutes under stirring. While maintaining the contents at the same temperature, they were reacted for 2 hours and 40 minutes. The resol so obtained was found to have a viscosity of 10.3 cps when measured at 85° C. by a Brookfield viscometer. The resol was also analyzed for residual formaldehyde by the sodium sulfite method. Residual formaldehyde was not detected. The weight average molecular weight (Mw) of the resol as measured by gel permeation chromatography was 400.

The above reaction product was then cooled to 50° C., to which 6.1 kg (0.041 kmol) of o-sec-butyl-phenol, 30.0 kg (0.174 kmol) of 2-aminobenzenesulfonic acid and 36.0 kg (0.328 kmol) of resorcin were gradually added as modifiers. The resulting mixture was heated to 75° C. over 30 minutes under stirring. While maintaining the mixture at the same temperature, the reaction was continued. When the viscosity of the reaction product arose to 1,300 cps when measured by the Brookfield viscometer, the temperature of the reaction mixture was lowered, followed by the addition of an aqueous solution of sodium hydroxide to terminate the reaction. The pH and Mw of the condensate so obtained were 11.2 and 1,740, respectively.

The condensate obtained above was formulated as an anti-fouling agent B into a 2.0% aqueous solution in a 0.4% aqueous NaOH solution. The pH of the alkaline aqueous solution so obtained was adjusted to pH 8.0 with citric acid, so that a solution of the anti-fouling agent B was obtained.

PREPARATION EXAMPLE 3

(Phenol-Type Anti-Fouling Agent C and Solution Thereof)

In a 1.5-m$^3$ reaction vessel made of stainless steel and equipped with a thermometer and a stirrer, 154.0 kg (1.64 kmol) of phenol, 81.2 kg of water, and 6.56 kg (0.164 kmol) of sodium hydroxide were charged. The contents were then heated to 90° C. over 30 minutes under stirring. After maintaining the contents at the same temperature for 10 minutes, 135.2 kg (2.46 kmol) of an 80% aqueous solution of acetaldehyde were charged at a constant rate over 45 minutes. While maintaining at 90° C., they were reacted for 3 hours. The reaction mixture was then cooled. When the internal temperature dropped to 50° C., 6.1 kg (0.041 kmol) of OSBP, 57.8 kg (0.459 kmol) of pyrogallol and 32.5 kg (0.180 kmol) of a 95.6% purity p-toluenesulfonic acid were charged. The temperature was then gradually raised, and the reaction was continued at 85° C. for 4 hours. The temperature was then lowered, followed by the charging of an aqueous solution of sodium hydroxide to terminate the reaction.

The condensate obtained above was formulated as an anti-fouling agent C into a 2.0% aqueous solution in a 0.4% aqueous NaOH solution. The pH of the alkaline aqueous solution so obtained was adjusted to pH 10.5 with citric acid, so that a solution of the anti-fouling agent C was obtained.

EXAMPLE 1

Air inside a polymerization reaction tank having an internal capacity of 133 m$^3$ and equipped with a reflux condenser was evacuated by a vacuum pump. After vinyl chloride monomer was charged into the polymerization reaction tank to an internal pressure of 0.1 kg/cm$^2$-G, hot water was circulated through a jacket to raise the inner wall temperature of the polymerization reaction tank to 80° C. The solution of the anti-fouling agent A, said solution having been formulated in Preparation Example 1, was sprayed and applied on an inner wall of the polymerization reaction tank, and the interior of the polymerization reaction was thoroughly rinsed with water. Compressed air was then introduced into the polymerization reaction tank so that the proportion of oxygen reached 30 ppm by weight based on vinyl chloride monomer to be charged subsequently. Then, 42.6 tons of deionized water were charged. Charged next by pumps were, as dispersing agents, 0.015 phm (the weight per 100 parts of vinyl chloride monomer; this will hereinafter apply equally) of PVA-A having a saponification degree of 80 mol % and a polymerization degree of 2,000 and 0.045 phm of PVA-B having a saponification degree of 70 mol % and a polymerization degree of 700; 45.6 tons of vinyl chloride monomer; and as polymerization initiators, 28 kg (16.8 kg in a purified form) of a 60 wt. % aqueous emulsion of dioctyl peroxydicarbonate (aqueous OPP emulsion) and 19 kg (7.6 kg in a purified form) of a 40 wt. % aqueous emulsion of α-cumyl peroxyneodecanoate (aqueous CuND emulsion). According to the results of an actual measurement, the concentration of oxygen within the polymerization reaction tank was 30 ppm by weight.

The reaction temperature was raised to 57.5° C. to initiate a polymerization reaction. Four hours and 10 minutes later, an aqueous suspension of a phenolic anti-fouling agent was charged by a pump and a slurry was discharged from the polymerization reaction tank. The slurry was then fed through a stripping tower for vinyl chloride monomer. The PVC slurry was taken out as a cake and then dried to obtain PVC as a final product. Physical properties (bulk specific gravity, particle size distribution, fish eyes, and thermal stability) of the PVC so obtained were measured.

The polymerization reaction tank from which the PVC slurry had been discharged was washed with water without opening a lid of a manhole, the internal pressure was adjusted to 0.1 kg/cm$^2$-G, and hot water was circulated through the jacket to raise the inner wall temperature of the polymerization reaction tank to 80° C. The solution of the anti-fouling agent A was applied, followed by the charging of materials for the next batch reaction. The results of the polymerization conducted continuously in the closed mode are presented in Table 1.

In this example, the first batch reaction was conducted from the state that the polymerization reaction tank was opened to the atmosphere. In general, however, as is observed from the next batch in this example, the polymerization is continued without opening the polymerization reaction tank to the atmosphere after the completion of the reaction of the preceding batch.

The expression "without purged with air" as used herein means that polymerization is continued, as is, without opening the polymerization reaction tank to the atmosphere subsequent to the completion of the reaction of the first batch.

EXAMPLES 2-3

In each example, polymerization was conducted as in Example 1 except that the ratio of oxygen to vinyl chloride monomer was changed. The results of the experiments are presented in Table 1.

COMPARATIVE EXAMPLE 1

Polymerization was conducted as in Example 1 except that compressed air was deliberately not introduced into the polymerization reaction tank and oxygen was not added to vinyl chloride monomer in the polymerization reaction tank. The results are presented in Table 1.

EXAMPLE 4

Polymerization was conducted as in Example 1 except that 0.05 phm of PVA-C having a saponification degree of 98 mol % and a polymerization degree of 2,000, 0.05 phm of PVC-A having a saponification degree of 80 mol % and a polymerization degree of 2,000 and 0.1 phm of hydroxypropylmethylcellulose (HPMC) having a surface tension of 48 dyne/cm when measured in the form of a 1 wt. % aqueous solution were used as dispersing agents and the ratio of oxygen to vinyl chloride monomer was changed. The results of the polymerization are presented in Table 1. Incidentally, reductions in physical properties such as bulk specific gravity and thermal stability were observed when oxygen was not added.

EXAMPLE 5

Polymerization was conducted as in Example 1 except that the solution of the anti-fouling agent B, said solution having been formulated in Preparation Example 2, was used. The results are shown in Table 1.

COMPARATIVE EXAMPLE 2

Polymerization was conducted as in Example 1 except that the solution of the anti-fouling agent B, said solution having been formulated in Preparation Example 2, was used, compressed air was deliberately not introduced into the polymerization reaction tank prior to the polymerization and no oxygen was added to vinyl chloride polymer inside the polymerization reaction tank. The results are shown in Table 1.

EXAMPLE 6

Air inside a polymerization reaction tank having an internal capacity of 133 m$^3$ and equipped with a reflux condenser was evacuated by a vacuum pump. After vinyl chloride monomer was charged into the polymerization reaction tank to an internal pressure of 0.1 kg/cm$^2$-G, compressed air was introduced into the polymerization reaction tank so that the concentration of oxygen in the polymerization reaction tank reached 3,300 ppm by weight. Hot water was then circulated through a jacket to raise the inner wall temperature of the polymerization reaction tank to 65° C. The aqueous solution of the anti-fouling agent C, said aqueous solution having been formulated in Preparation Example 3, was sprayed and applied on an inner wall of the polymerization reaction tank, and the interior of the polymerization reaction was thoroughly rinsed with water. Then, 42.6 tons of deionized water were charged. Charged next by pumps were 0.015 phm of PVA-A, 0.045 phm of PVA-B, 45.6 tons of vinyl chloride monomer, 28 kg of the aqueous OPP emulsion and 19 kg of the aqueous CuND emulsion. According to the results of an actual measurement, the concentration of oxygen within the polymerization reaction tank at that stage was 28 ppm by weight based on the vinyl chloride monomer.

The reaction temperature was raised to 57.5° C. to initiate a polymerization reaction. Four hours and 10 minutes later, an aqueous suspension of a phenolic anti-oxidant was charged by a pump and a slurry was discharged from the polymerization reaction tank. The slurry was then fed through a stripper for vinyl chloride monomer. The PVC slurry was taken out as a filtered cake and then dried to obtain PVC as a final product. Physical properties of the PVC so obtained were measured.

The polymerization reaction tank from which the PVC slurry had been discharged was washed with water without opening a lid of a manhole, the internal pressure was adjusted to 0.1 kg/cm$^2$-G, compressed air was introduced into the polymerization reaction tank, hot water was circulated through a jacket to raise the inner wall temperature of the polymerization reaction tank to 65° C., the aqueous solution of the anti-fouling agent C was applied, and materials for the next batch reaction were charged. The results of the polymerization conducted continuously in the closed mode are presented in Table 1.

COMPARATIVE EXAMPLE 3

Polymerization was conducted as in Example 6 except that the solution of the anti-fouling agent C, said solution having been formulated in Preparation Example 3, was used, compressed air was deliberately not introduced into the polymerization reaction tank prior to the polymerization and the ratio of the oxygen to the vinyl chloride monomer inside the polymerization reaction tank was not adjusted. The results are shown in Table 1.

TABLE 1

|  | Example | | | | | | Comp. Ex. | | |
| --- | --- | --- | --- | --- | --- | --- | --- | --- | --- |
|  | 1 | 2 | 3 | 4 | 5 | 6 | 1 | 2 | 3 |
| Compressed air | Introduced | | | | | | Not introduced | | |
| type of anti-fouling agent | A | A | A | A | B | C | A | B | C |
| Deionized water (tons) | 42.6 | 42.6 | 42.6 | 42.6 | 42.6 | 42.6 | 42.6 | 42.6 | 42.6 |
| VCM (tons) | 45.6 | 45.6 | 45.6 | 45.6 | 45.6 | 45.6 | 45.6 | 45.6 | 45.6 |
| PVA-A (phm) | 0.015 | 0.015 | 0.015 | 0.05 | 0.015 | 0.015 | 0.015 | 0.015 | 0.015 |
| PVA-B (phm) | 0.045 | 0.045 | 0.045 | — | 0.045 | 0.045 | 0.045 | 0.045 | 0.045 |
| PVA-C (phm) | — | — | — | 0.05 | — | — | — | — | — |
| HPMC (phm) | — | — | — | 0.01 | — | — | — | — | — |
| Aq. OPP emulsion (kg) | 28 | 28 | 28 | 28 | 28 | 28 | 28 | 28 | 28 |
| Aq. CuND emulsion (kg) | 19 | 19 | 19 | 19 | 19 | 19 | 19 | 19 | 19 |
| Oxygen concentration in the polymerizer at the time of initiation of polymerization (ppm) | 30 | 75 | 95 | 35 | 40 | 28 | 5 | 3 | 3 |
| Number of batches polymerized continuously | 40 | 40 | 40 | 40 | 40 | 40 | 5 | 5 | 5 |
| Amount of scale (kg/day) | 0.3 | 0.2 | 0.3 | 0.3 | 0.2 | 0.1 | 3.7 | 3.5 | 2.0 |
| Bulk specific gravity BD (g/ml) | 0.530 | 0.533 | 0.535 | 0.560 | 0.535 | 0.534 | 0.528 | 0.527 | 0.529 |
| Particle size distribution, on 60 mesh (%) | 0.2 | 0.0 | 0.0 | 0.0 | 0.1 | 0.1 | 0.3 | 0.3 | 0.3 |
| Number of fish eyes | 0 | 1 | 0 | 0 | 1 | 1 | 1 | 2 | 1 |
| Thermal stability (min) | 148 | 145 | 141 | 149 | 147 | 145 | 145 | 141 | 148 |

Note:
In each example, the data of the last batch are shown.

What is claimed is:

1. A process for the polymerization of vinyl chloride comprising providing a polymerizer which is coated with an anti-fouling agent, causing oxygen to exist in the polymerizer and polymerizing the vinyl chloride in a closed mode wherein polymerization is repeated without opening the polymerizer, the amount of oxygen being in the polymerizer being controlled whereby polymerization is initiated when oxygen is present in the polymerizer at 10–1000 ppm based on vinyl chloride charged to the polymerizer and whereby the effect of the anti-fouling agent is retained.

2. A process according to claim 1, wherein after completion of the polymerization reaction and discharge of a slurry, next polymerization is conducted without opening of the polymerizer to the atmosphere while vinyl chloride monomer still remains in a gas phase inside the polymerizer.

3. A process according to claim 1, wherein the anti-fouling agent is a condensate of a compound having a phenolic hydroxyl group.

4. A process according to claim 1, wherein the anti-fouling agent is a self-condensate of a compound having a phenolic hydroxyl group.

5. A process according to claim 1, wherein the anti-fouling agent is a condensate between a compound having a phenolic hydroxyl group and an aldehyde, or a modification product thereof.

6. A process according to claim 1, wherein the anti-fouling agent is a co-condensate between an initial condensate of a phenol and an aldehyde and at least one modifier selected from a hindered phenol, a polyhydric phenol or a nitrogen-containing compound.

7. A process according to claim 1, wherein the anti-fouling agent is a condensate of a dihydroxybiphenyl and an aldehyde.

8. A process according to claim 1, wherein the anti-fouling agent is a modified co-condensate obtained by further reacting, in the presence of a strongly acidic catalyst, an initial condensate between at least one phenol and at least one aldehyde other than formaldehyde with at least one hindered phenol and at least one polyhydric phenol.

9. A process for the polymerization of vinyl chloride comprising providing a polymerizer which is coated with an anti-fouling agent, causing oxygen to exist in the polymerizer and polymerizing the vinyl chloride in a closed mode wherein polymerization is repeated without opening the polymerizer, the amount of oxygen being in the polymerizer being controlled whereby polymerization is initiated when oxygen is present in the polymerizer at 10–1000 ppm based on vinyl chloride charged to the polymerizer and whereby the effect of the anti-fouling agent is retained, wherein the oxygen is caused to exist at 300–10000 ppm by weight in a gas phase of the polymerizer before, during or after application of the anti-fouling agent.

* * * * *